March 21, 1961     J. E. SEYMOUR     2,976,126
APPARATUS FOR MANUFACTURING MIXED FERTILIZERS
Filed Sept. 18, 1957
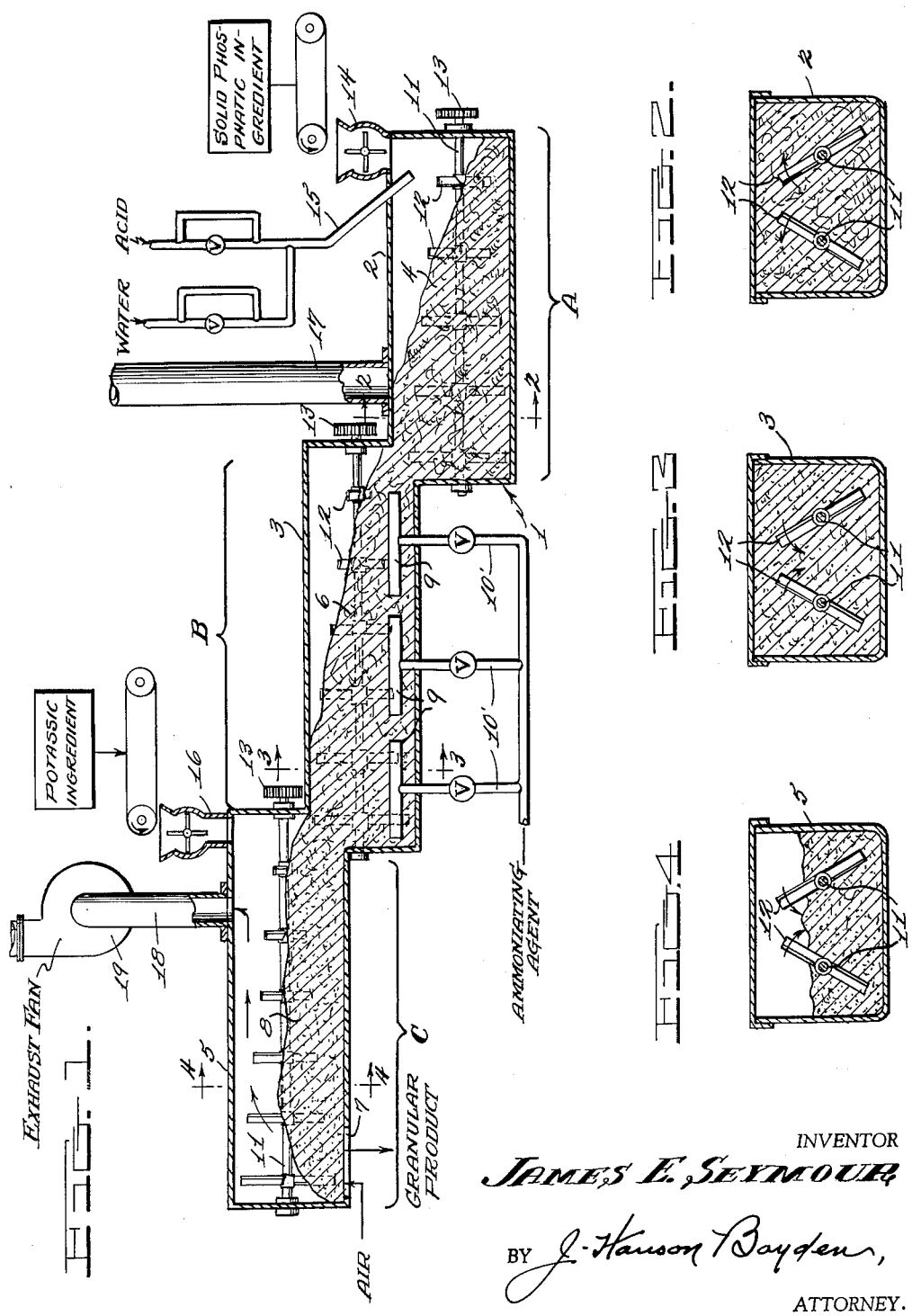
INVENTOR
JAMES E. SEYMOUR,
BY J. Hanson Boyden,
ATTORNEY.

— # United States Patent Office 2,976,126
Patented Mar. 21, 1961

2,976,126

APPARATUS FOR MANUFACTURING MIXED FERTILIZERS

James E. Seymour, Collinsville, Ill., assignor, by mesne assignments, to Central Farmers Fertilizer Company, Chicago, Ill., a corporation of Illinois Filed Sept. 18, 1957, Ser. No. 684,713

4 Claims. (Cl. 23—259.2)

This invention relates to the manufacture of fertilizers and more particularly to an improved self-granulating process for manufacturing mixed fertilizers, and to an improved apparatus for carrying out such process.

With the present increasing commercial demand for granular fertilizers, there is a growing trend in the fertilizer industry toward manufacturing procedures which provide a fully granular product. It is obviously preferable to employ a manufacturing procedure which is self-granulating, that is, which does not require a special granulating step in addition to the steps required for chemical processing.

Several manufacturing processes have attained recent recognition. One process passes a fertilizer material, such as superphosphate, and potash through an inclined rotating drum in such manner that the solids follow a generally helical path through the drum. The moving solids form a substantial bed, and the liquid reactants, comprising an acid, water and an ammoniating agent, are injected into such bed along a line extending longitudinally of the drum adjacent to the bottom of the bed. In such process, the liquids react on the surfaces of the solid particles. In a somewhat similar process, the solids are supplied to a rotating drum and the liquid reactants are sprayed into the drum, the acid and ammonia being reacted before introduction. In addition to reaction of liquids and solids, this latter process involves a reactive gaseous phase. A third process is described in my copending application, Serial Number 497,785, filed March 29, 1955. Here, a slurry of a metaphosphate, an acid and water is prepared in a pug mill, an ammoniating agent is introduced, and the slurry converted to a granular product by crystallization and disintegration.

Insofar as I am aware, no process known prior to the present invention has as yet proved entirely satisfactory for commercial self-granulating operation without requiring at least some special restrictions on the manufacturing operation. The first two processes mentioned both involve reaction at the surface of particles which tend to remain solid throughout the process. Thus, the final product consists of granules which are not homogeneous, the outer portion being predominantly potash when an NPK fertilizer is produced. Again, both such processes are only self-granulating for certain grades of product, so that the manufacturer must employ special granulating equipment. While the process of my copending application Serial Number 497,785, avoids such difficulties, it employs a special starting material, namely, a metaphosphate.

The present invention provides an improved process basically similar to that described in my aforementioned copending application, but useful in the production of mixed fertilizers from a wide range of starting materials, and to a novel apparatus for carrying out the process.

The primary object of my invention is to provide an improved self-granulating process and apparatus for manufacturing mixed fertilizers which process and apparatus are more flexible than any heretofore devised and which provides more effective granulation.

Another object is to provide such a process and apparatus capable of producing, with self-granulation, a wide variety of grades of mixed fertilizers.

A further object is to devise a self-granulating mixed fertilizer process and apparatus characterized by higher ammoniation efficiencies.

SUMMARY OF INVENTION

Broadly, I accomplish these objects by introducing a plurality of exothermically reactive fertilizer compounds and water into a first zone of an elongated mixing chamber, intimately mixing the compounds and water in such first zone to form a hot reaction mixture capable of being continuously moved through such zone during mixing. Such reaction mixture is continuously advanced into a second zone of the chamber while maintaining a continuous vapor seal between the two zones. Then while the reaction mixture is continuously advanced through the second zone, such advance being accompanied by continual agitation, I contact the reaction mixture with a drying gas. Such steps establish in the first zone conditions which promote complete and rapid reaction while retaining both heat and liquid phase, producing a reaction mixture which is self-granulating in the second zone, where the conditions are such as to promote a rapid decrease in the liquid phase.

Thus, I may form a reaction mixture having a substantial liquid phase and containing at least one fertilizer compound capable of reacting exothermically with ammonia to form a water-soluble ammonium salt, advance the reaction mixture in an elongated mixing zone in such manner that a vapor seal is effected at one point along the zone, with the reaction mixture forming a deep bed upstream of the seal, inject an ammoniating agent into the reaction mixture upstream of the seal, advance the ammoniated reaction mixture beyond the seal and then further advance the reaction mixture toward the downstream end of the mixing zone in a manner providing a maximum of exposed reaction mixture surface for contact with the atmosphere, pass a current of a drying gas over the reaction mixture downstream of the seal to effect removal of free moisture from the reaction mixture by evaporation, and recovering the resulting granular product.

By such a method, I am able to attain effective ammoniation upstream of the seal and to supply to the downstream portion of the mixing zone a hot reaction mixture having a substantial liquid phase, the liquid phase being substantially saturated with the water-soluble ammonium salts resulting from ammoniation, and then to subject this reaction mixture immediately to conditions, downstream of the seal, which cause crystallization and disintegration.

Primarily, such conditions are aimed at abruptly converting the substantially saturated liquid phase to a condition of over-saturation. This is accomplished first by contacting the reaction mixture with the air current, so removing free moisture by evaporation, and thus reducing solubility of the ammonium salts, because of the lowered temperature and because of the lesser amount of liquid remaining. Crystallization therefore commences. As crystallization proceeds, the concentration of ammonium salts in the liquid phase decreases correspondingly. The boiling point of the liquid phase therefore is lowered. As a result, as crystallization proceeds, the rate of evaporation of the moisture accelerates. Thus, as the reaction mixture advances downstream of the seal, the effects of decreasing salt solubility and decreasing boiling point are cumulative and crystallization proceeds at a progressively increasing rate until substantially no free liquid phase remains.

In certain advantageous embodiments of the invention, the effect of contacting the reaction mixture intimately with a drying atmosphere is supplemented by the incorporation of an additional solid material in the reaction mixture immediately downstream of the vapor seal. Since any satisfactory fertilizer manufacturing procedure should utilize all fines produced, it is advantageous to incorporate the fines in the reaction mixture at the point just mentioned. A more important improvement is obtained, however, if the ammoniating agent employed is a liquid composition containing a water-soluble salt which does not react in the ammoniation stage, and the solid material added just downstream from the seal is a potassic ingredient capable of reacting with such salt to give less soluble products. Thus, for example, the ammoniating composition can include ammonium nitrate and the added potassic ingredient can be potassium chloride. Then, when the potassium chloride is added, it will begin to dissolve in the liquid phase of the reaction mixture and then will react with the ammonium nitrate to form potassium nitrate and ammonium chloride. Dissolving of the potassium chloride lowers the temperature of the reaction mixture because of the negative heat of solution of the potassium chloride. The ammonium chloride and potassium nitrate are relatively less soluble in the liquid phase of the reaction mixture than are ammonium nitrate and potassium chloride. Thus, crystallization begins even before the air current has any major effect in reducing the liquid phase by evaporation.

Above, I have described a process embodiment of the invention using only one effective vapor seal, the seal being between the ammoniation and granulating portion of the mixing zone. Advantageously, I employ two effective vapor seals, one at each end of the ammoniation section, so that neither heat nor moisture is lost to any major extent during ammoniation. In this connection, a characteristic feature of all embodiments of the invention is conservation of the liquid phase and exothermic heat up to the point where granulation is desired, followed by rapid dissipation of heat and moisture to effect crystallization.

Advantageously, I maintain the vapor seals by passing the reaction mixture through a portion of the mixing zone in the form of a bed and depth of which progressively increases until the reaction mixture completely fills the cross-section of the mixing zone at the point where the seal is desired. As will be explained in detail hereinafter, the increasing depth of the reaction mixture bed is obtained by having the successive zones of the mixing chamber arranged in ascending series, the junction between adjacent ones of the zones forming a dam against and up which the reaction mixture flows during its advance by the mixing operation.

GENERAL DESCRIPTION OF MANIPULATIVE STEPS AND APPARATUS

The process will be described with reference to the accompanying drawings, which form a part of this specification, and wherein:

Fig. 1 is a diagrammatic, vertical, longitudinal sectional view of one form of apparatus suitable for carrying out the method;

Fig. 2 is a transverse sectional view taken on line 2—2, Fig. 1;

Fig. 3 is a transverse sectional view taken on line 3—3, Fig. 1, and

Fig. 4 is a transverse sectional view taken on line 4—4, Fig. 1.

Referring now to the drawings in detail, it will be seen that the apparatus embodiment of the invention here illustrated comprises a compound double pug mill 1 providing an elongated mixing zone including a preliminary mixing portion A, an intermediate portion B and a final portion C. First section 2 of the pug mill is disposed below the second section 3. Therefore, with a proper relation between the rate at which the reaction mixture is advanced in section 2 and the amount of starting materials supplied thereto, the reaction mixture in the first section will form a moving bed 4 the depth of which increases until, at the downstream end of section 2, the reaction mixture completely fills the cross-section area of the pug mill.

Similarly, intermediate section 3 of the pug mill is disposed on a lower level than final section 5. Therefore, the moving reaction bed 6 increases in depth until it completely fills the cross-sectional area of the pug mill at the downstream end of section 3. Seals are thus maintained at both ends of section 3. It will thus be seen that sections 2, 3 and 5 of the pug mill are arranged in ascending series, with the junctions between sections forming dams at the downstream ends of sections 2 and 3, so that the reaction bed must flow against and up the dams. It will be further noted that downstream end portion 2' of section 2 and upstream end portion 3' of section 3 are in planes spaced apart longitudinally of the pug mill by a distance sufficiently small that the action of the dam between sections 2 and 3 can readily cause the reaction bed to completely fill the opening communicating between these two sections. The downstream end 3" of section 3 and upstream end 5' are similarly arranged.

In the final section 5 of the pug mill, the product escapes through outlet 7. Since there is no dam in section 5 opposing the advance of the material, the moving bed 8 is relatively shallower than is the case in sections 2 and 3. In this connection, it will be noted that the shallow depth of the reaction bed here is such that the pug mill blades are continually breaking through the surface of the bed, the depth of the bed in this section being considerably less than the length of the blades.

In order to inject a fluid ammoniating agent into the reaction mixture in intermediate section 3, a multi-part sparger 9 is provided, extending longitudinally of the pug mill adjacent the bottom of section 3. Each section of sparger 9 is connected to supply pipe 10 by a valved line 10', so that the ammoniating agent can be supplied under pressure selectively to any one or any combination of the parts of the sparger. Thus, the ammoniating agent can be injected throughout the intermediate section of the pug mill or only in a selected portion thereof.

Each section of the pug mill is provided with a pair of parallel shafts 11 carrying the usual pug mill blades 12, the shafts being driven by any suitable power means through gears 13. The drive means is so arranged that the shafts of each pair are contra-rotating. As indicated by the arrows in Figs. 3 and 4, the arrangement for sections 3 and 5 is such that the pug mill blades carry the reaction mixture downwardly at the center line of the pug mill and outwardly along the bottom. Thus, in the ammoniation section, the reaction mixture tends to be dense in the area immediately above the line of injection of the ammoniation agent. In section 2, as seen in Fig. 2, the pug mill shafts may be contra-rotating in the opposite sense.

In all three sections of the pug mill, the pug mill blades 12 serve to advance the reaction mixture with positive pressure and also to effect continuous agitation. In the first and second sections of the pug mill, the reaction mixture bed completely covers the pug mill blades, during ther full rotation, toward the downstream ends of such section. In the final section, however, the pug mill blades cut completely through the reaction mixture bed in order to enhance contact with the atmosphere above the bed.

In the intermediate pug mill section, the entire sparger 9 is covered by the reaction mixture, so that the escape of gaseous ammonia from the bed is minimized. Further, the reaction mixture forms a seal at each end of the intermediate section, so that the gaseous atmosphere is retained within the ammoniation section.

Solid reactants are supplied continuously to the upstream end of section 2 by a star feeder 14 or equivalent means. Liquid reactants are added in this section by a suitable injector pipe 15. In final section 5, the potassic ingredient is introduced by means of a star feeder 16 or equivalent. The fines can be added by an additional star feeder adjacent to feeder 16, or through feeder 16.

In section 2 of the pug mill, the atmosphere is vented by a stack 17 providing only a natural draft. Thus, only enough venting action is provided by stack 17 to prevent the occurrence of superatmospheric pressures in section 2. Section 3 is not vented.

Section 5 is provided with an exhaust duct 18 connected to the input side of an exhaust fan 19. Thus, by reason of the action of the exhaust fan, atmpsheric air is drawn into section 5 through opening 7 and passed in counter-current relation over the moving bed 8. Since the bed 8 is progressively more solid as it approaches the output end of the mixing zone, there is a material tumbling action in the downstream portion of section 5, so that effective contact is maintained between the bed 8 and the current of drying air. It will be noted that bed 8 is relatively shallow, providing for effective gas flow.

While other exothermically reacting materials may be employed, the present invention is particularly advantageous when an acidic, solid fertilizer material, namely, a superphosphate or a metaphosphate, is employed as a starting material.

SIMPLE AMMONIATION OF SUPERPHOSPHATES TO PRODUCE AN NP FERTILIZER

In this phase of the invention, a normal or triple superphosphate in granular form is supplied to the mixing zone and advanced toward the point of vapor seal as hereinbefore disclosed. Immediately upstream of the seal, a fluid ammoniating agent, preferably anhydrous ammonia, is injected into the moving bed in proportions for reaction with the monocalcium orthophosphate.

Thus, the super phosphate is continuously introduced through feeder 14 at a rate such that a vapor seal is maintained at the end of the preliminary mixing section 2. Anhydrous ammonia is injected through sparger 9 at a rate to provide in section 3 substantially molar proportions of ammonia and monocalcium orthophosphate. The reaction mixture then advanced from section 3 to section 5 is a hot, moist solid, loss of moisture being minimized in ammoniation section 3. When this reaction mixture enters section 5 of the mixing zone, it is immediately subjected to conditions promoting evaporation of moisture. As the moisture is removed by the air current induced by exhaust fan 19, crystallization of ammonium phosphate commences and proceeds at a progressively increasing rate, as bed 8 advances, until the product is granular, the granular product being delivered through outlet 7.

Example 1

Triple superphosphate in granular form is supplied through star feeder 14. Water is supplied through line 15 in proportion amounting to 4% of the weight of the superphosphate. The triple superphosphate and water are supplied at rates adequate to completely fill section 2 at the downstream end thereof, taking into consideration the speed at which the pug mill blades of section 2 are operated. Anhydrous ammonia is injected through sparger 9 in proportion for reaction with the superphosphate at the rate of 1⅓ moles ammonia to one mole of monocalcium orthophosphate. Reaction bed 6, as it approaches the end of section 3, is thus a hot, moist mass containing approximately 9% free liquid, the liquid phase being substantially saturated with ammonium phosphates. The solids are dicalcium phosphate and ammonium phosphates. At the downstream end of section 3, the temperature of the hot reaction mixture is 210–350° F., depending upon heat transfer characteristics of the apparatus employed. Exhaust fan 19 maintains a forced air draft through and across the bed 8 in section 5. The product becomes granular, usually within the first two feet of travel in section 5. The granular product delivered through opening 7 has a free moisture content of less than 1%. Using molar proportions of monocalcium orthophosphate and ammonia, the product analyzes approximately 7% nitrogen, 48% available $P_2O_5$.

The foregoing example demonstrates complete ammoniation of the superphosphate. Lesser proportions of ammonia can be employed.

Example 1 represents the most solid ammoniation reaction product, containing only about 9% free liquid, which can be successfully handled by the process of this invention.

AMMONIATION OF SUPERPHOSPHATE WITH CONCURRENT REACTION OF FREE ACID AND AMMONIA

According to this embodiment of the invention, a granular superphosphate is mixed in the first section of the mixing zone with water and a strong mineral acid to provide a slurry. The slurry is advanced to the second section and an ammoniating agent injected in proportion to react completely with all acidic constituents of the slurry. The resulting hot, ammoniated reaction mixture is then advanced beyond the vapor seal into the final portion of the mixing zone.

Using a mineral acid other than phosphoric, the acid will react with the superphosphate to produce phosphoric acid. Thus, the slurry entering the ammoniation zone will comprise water, acid, and a calcium salt dependent upon the acid employed. If sulfuric acid is employed, the salt is gypsum. If nitric acid is employed, the salt is calcium nitrate. If hydrochloric acid is employed, the salt is calcium chloride. If a mineral acid other than phosphoric acid is employed, the slurry delivered to the intermediate or ammoniation section of the mixing zone will be hot, ranging from 150° F. to 250° F., because the reactions of the mineral acids with monocalcium orthophosphate are exothermic.

It is again highly advantageous to so advance the reaction mixture into the ammoniation zone that there is a vapor seal between the first and intermediate sections of the mixing zone. Thus, the procedure can be as discussed with reference to Fig. 1.

In the intermediate mixing zone, the ammoniating agent reacts with the free acid and acidic salts to form the corresponding ammonium salts. The ammoniated reaction mixture contains a major liquid phase which is substantially saturated with water-soluble ammonium salts, primarily ammonium phosphates.

If the ammoniating agent is anhydrous ammonia, and an effective vapor seal is maintained at both ends of the ammoniation section, the reaction mixture delivered from the ammoniation section to the final section of the mixing zone will be at a higher temperature than the slurry entering the ammoniation section, assuming an acid other than phosphoric is employed. On the other hand, it is frequently advantageous to employ a liquid ammoniating composition containing a substantial proportion of water. In that event, again assuming that an acid other than phosphoric is employed, the reaction mixture temperature may not effectively increase in the ammoniation section. In fact, in some cases, such as the use of triple superphosphate and sulfuric acid in the preliminary mixing state, the reaction slurry delivered to the ammoniation section may actually be hotter than that delivered from the ammoniation stage to the final mixing section. In general, however, the reaction mixture passing the vapor seal between the second and third sections of the mixing zone will be at 210° F. or higher.

Example 2

Triple superphosphate, normal superphosphate and 60° Bé. sulfuric acid are supplied to the first mixing section of the elongated mixing zone in proportions to provide an initial slurry consisting of 616 parts by weight triple superphosphate, 580 parts by weight normal superphosphate and 136 parts by weight of the acid solution. The reactants are supplied at such rate that the reaction mixture fills the downstream end of the first section of the mixing zone. In the initial slurry, the sulfuric acid reacts with the superphosphates to produce phosphoric acid and gypsum.

In the intermediate mixing section, a liquid ammoniating composition consisting of 16.6% anhydrous ammonia, 66.8% ammonium nitrate and 16.6% water is injected into the reaction mixture in proportions to provide enough ammonia to neutralize the acidic constituents of the slurry. A hot reaction mixture is thus formed, containing a major liquid phase saturated with ammonium phosphates and ammonium nitrate, with some ammonium sulphate possible. The resulting reaction mixture is advanced beyond the downstream end of the ammoniation section in such manner that the reaction mixture fills the mixing zone at this point, forming a vapor seal. With the ammoniation section thus closed at both ends against vapor loss, the temperature of the ammoniated reaction mixture is in excess of 210° F. as it passes the downstream seal into the final mixing stage.

As soon as such reaction mixture is contacted by the drying atmosphere in the final mixing section, evaporation occurs, the liquid phase is therefore reduced, and the reaction mixture cooled. As a result, crystallization of the ammonium salts commences and proceeds at an increasing rate, as the material advances along the final mixing stage, until the product is completely granular. The product analyzes 16% nitrogen, 20% available $P_2O_5$.

HYDROLYSIS OF A METAPHOSPHATE AND AMMONIATION OF THE REACTION MIXTURE

In this embodiment of the invention, the starting materials supplied to the upstream end of the elongated mixing zone are (1) a metaphosphate selected from the group consisting of calcium metaphosphate, (2) water and (3) a strong mineral acid. The weight ratio of acid to metaphosphate is from 1:10 to 1.5:1. The proportion of water employed in the initial reaction mixture is from one to five times the stoichiometric proportion required for hydrolysis of the metaphosphate. As a result of mixing such starting materials, the metaphosphate is hydrolyzed to the corresponding primary orthophosphate. If an acid other than phosphoric is employed, the acid, which acts only as a catalyst in the metaphosphate hydrolysis, reacts with the primary orthophosphate to produce phosphoric acid and the corresponding calcium salt. The initial reaction mixture is a slurry, usually quite thin. Since the reactions involved are exothermic, the reaction product loses moisture in the preliminary mixing section and is delivered to the ammoniation section as a relatively thicker slurry at temperatures ranging as high as 350° F., depending upon the particular formulation.

In the ammoniation section of the mixing zone, a fluid ammoniating agent is introduced into the hot slurry in proportions to neutralize all of the acidic components thereof. By maintaining an effective vapor seal at both ends of the ammoniation zone, losses of ammonia and liquid are minimized, so that the reaction mixture passing the seal at the downstream end of the ammoniation section contains a major liquid phase substantially saturated with soluble ammonium salts. This reaction mixture, as it enters the final section of the elongated mixing zone, is so hot that the liquid phase is approximately at the boiling point.

As soon as the hot, ammoniated reaction mixture enters the final section of the mixing zone and is contacted with the drying atmosphere therein, evaporation occurs, resulting in a decrease in the liquid phase and a lowering of the temperature. Crystallization of the ammonium salts begins immediately, and continues at a progressively increasing rate until the product is dry and fully granular.

Example 3

Calcium metaphosphate, sulfuric acid (60 Bé.) and water are introduced at the upstream end of the mixing zone continuously to provide an initial slurry consisting of 35.50 parts by weight metaphosphate, 10.00 parts of the acid and 5.25 parts water. The starting materials are supplied at such a rate that the slurry fills the first section of the mixing zone at the downstream end of the first section, as seen in Fig. 1. The reaction mixture thus advanced into the ammoniation section of the mixing zone will be at 250–270° F., and consists of phosphoric acid, gypsum and water, with possible minor proportions of unreacted sulfuric acid and calcium metaphosphate.

In the intermediate mixing section, a liquid ammoniating composition consisting of 34% anhydrous ammonia, 60% ammonium nitrate and 6% water is injected in proportions for complete neutralization of the acidic constituents of the reaction mixture delivered to the ammoniation stage. This ammoniation step results in the formation of soluble ammonium salts, primarily ammonium phosphates. Since the reaction slurry entering the ammoniation section of the mixing zone has a substantial liquid phase, and since the ammoniating composition itself is liquid, the ammoniated reaction mixture will contain a very substantial liquid phase. While the temperature in the ammoniation section is dependent upon variables such as dilution and heat transfer factors, it is obvious that the ammoniated reaction mixture will be at a temperature in excess of 210° F.

The ammoniated reaction mixture is advanced along the intermediate section of the mixing zone in such manner that the reaction mixture completely fills the cross-sectional area of the mixing zone at the downstream end of the intermediate mixing section. Thus, a vapor seal is maintained at both ends of the ammoniation zone, not only enhancing ammoniation efficiency but also minimizing loss of the liquid phase.

After passing the second seal, the ammoniated reaction mixture is brought into contact with a drying atmosphere in the final section of the mixing zone. This is accomplished by passing a current of air through the final section of the mixing zone counter-current to the reaction product, as above discussed with reference to Fig. 1. In the upstream portion of the mixing zone, loss of liquid phase occurs by evaporation, accompanied by temperature reduction resulting from the evaporation, so that crystallization of the ammonium salts commences. Because of the cumulative effect of decreased boiling point of the liquid phase and decreased solubility of the salts, crystallization proceeds at a progressively increasing rate as the reaction mixture approaches the delivery end of the mixing zone, and the product becomes completely granular. The final product is approximately 1–4–0.

Other metaphosphate formulations, as disclosed in my copending application Serial Number 497,785, can be employed. While Example 1 represents the lowest acceptable liquid content in the ammoniated reaction mixture according to the present invention, the metaphosphate hydrolysis formulations present the most fluid ammoniated reaction products, with the liquid content running as high as 80% of the ammoniated composition.

EMBODIMENTS OF THE INVENTION EMPLOYING A POTASSIC INGREDIENT TO ACCELERATE CRYSTALLIZATION OF THE PRODUCT

In these embodiments of the invention, I employ as the ammoniating agent a liquid composition comprising not only neutralizing ammonia but also an ammonium salt in solution. Then, at a point immediately downstream of the vapor seal at the end of the ammoniation section of the mixing zone, I incorporate a solid potassic ingredient which will react with such ammonium salts to give reaction products which are less soluble in the liquid phase.

Thus, the ammoniating composition can contain ammonium nitrate, and the potassic ingredient can be potassium chloride or potassium sulfate. In the first instance, the potassium chloride and ammonium nitrate react to form ammonium chloride and potassium nitrate, which are less soluble in the liquid phase than are ammonium nitrate and potassium chloride. In the second instance, the potassium sulfate, and ammonium nitrate react to form potassium nitrate and ammonium sulfate, both of which are less soluble than the starting materials. Similarly, the ammoniating composition may contain ammonium sulfate, and the potassic ingredient can then be potassium chloride, so that the ammonium sulfate and potassium chloride react to form ammonium chloride and potassium sulfate.

With the potassic ingredient added immediately downstream of the vapor seal at the end of the ammoniation section, and with the liquid phase of the reaction mixture already substantially saturated at this point with ammonium salts, crystallization of ammonium salts commences as soon as a substantial amount of reaction between the potassic ingredient and the ammonium salt contained in the ammoniating composition occurs.

In these embodiments of the invention, the countercurrent flow of drying gas in the downstream section of the mixing zone is still employed. But, since crystallization of the ammonium salts is already promoted by the action of the added potassic ingredient, contact of the reaction mixture with the drying atmosphere effects complete granulation more promptly than if the potassic ingredient were not used.

*Example 4*

The procedure of Example 3 is repeated, except that potassium chloride is added to the reaction mixture at a point just downstream of the vapor seal at the end of the ammoniation section of the elongated mixing zone. The potassium chloride is added at a rate to provide 37.5 parts per weight thereof. As soon as it is introduced, the potassium chloride begins to go into solution and reacts with the ammonium nitrate. Potassium nitrate and ammonium chloride tend to crystallize even before the air current in the final mixing section has a chance to be effective. Thus, complete granulation is accomplished much more quickly than in Example 3. The product analyzes approximately 6% nitrogen, 23% available $P_2O_5$ and 23% potash as $K_2O$.

*Example 5*

Triple superphosphate and 66° Bé. sulfuric acid are supplied to the upstream end of the elongated mixing zone in proportions providing a slurry comprising 654 parts by weight superphosphate and 184 parts by weight acid, the reactants being supplied at such a rate that the reaction slurry fills the mixing zone at the downstream end of the preliminary mixing section. During the preliminary mixing step, the sulfuric acid reacts with the monocalcium orthophosphate to produce phosphoric acid and gypsum. This reaction being strongly exothermic, the reaction mixture supplied to the intermediate section of the mixing zone is at an elevated temperature of 150–250° F.

In the intermediate mixing section, an ammoniating solution consisting of 16.6% anhydrous ammonia, 16.6% water and 66.8 ammonium nitrate is injected into the reaction mixture in proportions to provide 812 parts by weight of the solution. The reaction mixture is advanced through the intermediate mixing section in such manner that the downstream portion thereof is closed by the reaction mixture. Thus, the intermediate or ammoniation section of the elongated mixing zone is closed at each end against vapor loss.

The ammoniated reaction mixture contains a major liquid phase saturated with ammonium phosphates, produced by neutralization of the phosphoric acid formed in the first step, and the ammonium nitrate introduced in the ammoniating solution. The ammoniated reaction mixture is hot, in excess of 210° F.

Immediately after the seal at the downstream end of the ammoniation zone, potassium chloride is added at a rate such that 500 parts by weight thereof are incorporated to the ammoniated reaction mixture. The potassium chloride immediately begins to react with the ammonium nitrate in the liquid phase of the reaction mixture, forming ammonium chloride and potassium nitrate which, because of their lower solubility in the liquid phase, begin to crystallize.

Downstream of the point of potash addition, the advancing reaction mixture is subjected to contact with a current of air flowing counter-current thereto. Crystallization again proceeds at an increasing rate as the reaction mixture advances, until, at the end of the mixing zone, a fully granular 15–15–15 fertilizer product is recovered.

In Examples 4 and 5, the potassium chloride can be replaced by potassium sulfate, or the ammonium nitrate by ammonium sulfate. In all such cases, the potassic ingredient reacts with the ammonium salt introduced during ammoniation, so that fertilizer salts are formed, in the upstream position of the final mixing section, which are less soluble than those carried forward by the ammoniated reaction mixture.

EMBODIMENTS STARTING WITH A POTASSIUM SALT

In this phase of the invention, the solid material supplied to the initial section of the mixing zone is a substantially neutral potassium salt which can be the chloride, nitrate or sulfate. The salt is mixed with water in the initial section, and the resulting mixture, varying from a moist solid to a slurry, is advanced in such manner that it fills the mixing zone, forming a vapor seal, between the first and intermediate sections of the mixing zone.

In the intermediate section, both an ammoniating agent and a strong mineral acid are injected into the reaction mixture in proportions for complete neutralization of the acid. The ammoniating agent and acid can be added simultaneously, or, working in the apparatus of Fig. 1, the acid can be added via an upstream section of the sparger and the ammoniating agent via a down stream section. Assuming a major aqueous phase, obtained either by addition of water in the first section of the mixing zone or by inclusion of water in the ammoniating agent, or both, the ammoniating agent can advantageously be in the form of an aqueous solution containing a soluble ammonium salt which will react with the potassic ingredient.

The resulting reaction mixture will be at an elevated temperature, as a result of exothermic reaction between the acid and ammonia. The liquid phase is substantially saturated with the ammonium salts resulting from such reaction and, depending upon the formulation employed, a substantial amount of crystalline ammonium salts may be formed during ammoniation.

The ammoniated reaction mixture is advanced in the intermediate mixing section in such manner that the reaction mixture fills the downstream end thereof, forming a vapor seal. In the portion of the elongated mixing zone downstream of such seal, the reaction mixture is advanced in contact with a current of air or other drying gas. As in the previous examples, contact of the reaction mixture by the air current causes reduction of the liquid phase of the reaction mixture by evaporation, with accompanying cooling and a corresponding decrease in solubility of the ammonium salts in the liquid phase of the reaction mixture. Crystallization thus occurs rapidly as the reaction mixture advances, with resultant complete granulation due to the fact that the reaction mixture is being mixed throughout crystallization.

In this phase of the invention, even though no acidic material is introduced in the preliminary mixing step, it will be noted that the reaction mixture at the time of ammoniation always comprises an acid material which reacts exothermically with ammonia.

*Example 6*

Working in an apparatus such as that shown in the drawings, potassium chloride (62%) and water are supplied to the entrance end of the elongated mixing zone at a rate providing an initial wet mixture consisting of 31.27 parts by weight potassium chloride and 4.00 parts by weight water. This mixture is advanced through the preliminary mixing section in such manner that the mixture fills the mixing zone at the downstream end of the preliminary mixing zone. Since this mixture is wet, a vapor seal is formed at such point.

The mixture is advanced beyond such seal into the ammoniation section of the mixing zone. Here, 66° Bé. sulfuric acid and a liquid ammoniating composition are separately injected into the reaction mixture, as by using two sparger pipes side by side. The ammoniating composition consists of 16.6% anhydrous ammonia, 66.8% ammonium nitrate and 16.6% water. The acid and ammoniating composition are supplied at a rate providing 26.85 parts by weight of the acid and 52.41 parts by weight of the ammoniating composition.

Being added simultaneously, the acid and ammonia react exothermically to produce ammonium sulfate. The ammonium nitrate introduced as part of the ammoniating composition reacts with the potassium chloride, forming ammonium chloride and potassium nitrate. A hot reaction mixture results wherein the liquid phase is substantially saturated with ammonium sulfate, ammonium nitrate, ammonium chloride and potash. This reaction mixture contains at least 12% liquids and is at a temperature in excess of 210° F.

This hot reaction mixture is advanced through the intermediate section of the elongated mixing zone in such manner that the reaction mixture fills the mixing zone, forming a second seal, at the downstream end of the intermediate section. Seals are thus maintained at both ends of the section of the mixing zone in which ammoniation occurs. Vapor losses are therefore minimized, conserving both heat and liquid phase until after the reaction mixture passes the second seal.

Downstream of the second seal, the reaction mixture is further advanced as a relatively shallow bed, agitation being continuous throughout. A current of air is passed over this relatively shallower bed in countercurrent relation. Thus, downstream of the second seal, moisture is removed from the reaction mixture by evaporation, and the ammonia salts and potash dissolved in the liquid phase therefore crystallize at a progressive rate until the product is fully granular. The final product is recovered at the downstream end of the mixing zone as a 19-0-19 ratio fertilizer containing less than 1% free moisture.

A similar process can be carried out with potassium sulfate or potassium nitrate as the starting material.

While the examples illustrate various chemical processes, it will be noted that in each case the manipulative steps of the present invention have been employed in a manner to cause prompt granulation of the product. In each case a vapor seal separates the mixing zone into an upstream section where ammoniation is carried out, and a downstream section where granulation occurs. Upstream of this seal, vapor losses are minimized, so that high ammoniation efficiencies are attained and the heat and liquid phase are conserved until the reaction mixture passes the seal. Such minimum vapor loss results from two factors. First, the ammoniation reaction mixture is maintained as a relatively deep bed resulting from the manner in which the reaction mixture is handled to provide the vapor seal. Second, a seal is also maintained at the upstream end of the ammoniation section.

On the other hand, downstream from the seal at the end of the ammoniation section, the procedure is such as to promote drastic reduction of the liquid phase by evaporation. Were it not for the presence of the vapor seal between the ammoniation and granulation sections of the mixing zone it would be impossible to accomplish such drastic reduction of the liquid phase, since the conditions responsible for moisture loss by evaporation are just the opposite of those which must be maintained in the ammoniation section.

In each example, the ammoniated reaction mixture is at a relatively high temperature, in excess of 210° F., and contains a free liquid phase amounting to at least 9% of the reaction mixture, the liquid phase being substantially saturated with ammonium salt. Under the high temperature conditions in the ammoniating section, there is no tendency for extensive crystallization. But, as soon as the hot reaction mixture passes the seal and comes into contact with the current of drying gas, both the amount of free liquid and the temperature of the reaction mixture are reduced, and crystallization commences. Thereafter, the conditions promoting crystallization are cumulative, so that granulation is very prompt.

I claim:

1. An apparatus for use in manufacturing granular mixed fertilizer comprising: a first elongated, substantially closed reaction chamber; a second elongated, closed reaction chamber arranged in ascending series with said first reaction chamber, the downstream end of said first chamber communicating with the upstream end of said second chamber by means of a throat; a third elongated, ventilated reaction chamber arranged in ascending series with said second reaction chamber, the downstream end of said second chamber communicating with the upstream end of said third chamber by means of a throat; supply means feeding fertilizer ingredients and water to said first chamber; mixing and advancing means arranged in each of said chamber for advancing the mixture of said fertilizer ingredients and said water in the form of a reaction bed, said bed creating a vapor seal at each of said throats; and evaporating means for passing a current of drying gas through said third chamber in intimate contact with said mixture.

2. An apparatus for use in manufacturing granular mixed fertilizer comprising: a first elongated, substantially closed reaction chamber; a second elongated, closed reaction chamber arranged in ascending series with said first reaction chamber, the downstream end of said first chamber communicating with the upstream end of said second chamber by means of a throat; a third elongated, ventilated reaction chamber arranged in ascending series with said second reaction chamber, the downstream end of said second chamber communicating with the upstream end of said third chamber by means of a throat; supply means feeding fertilizer ingredients and water to said first chamber and feeding an ammoniating agent to said second chamber; mixing and advancing means arranged in each of said chambers for advancing the mixture of said fertilizer ingredients and said water in the form of a reaction bed, said bed creating a vapor seal at each of said throats; and evaporating means for passing a current of drying gas through said third chamber in intimate contact with said mixture.

3. An apparatus for use in manufacturing granular mixed fertilizer and comprising a first elongated reaction chamber, a second elongated and closed reaction chamber arranged in ascending series with said first reaction chamber and with the downstream end of said first chamber communicating with the upstream end of said second chamber by means of a throat, a third elongated and ventilated reaction chamber arranged in ascending series with said second chamber and with the downstream end of said second chamber communicating with the upstream end of said third chamber by means of a throat, supply means feeding fertilizer ingredients and water to said first chamber, mixing and advancing means arranged in each of said chambers for advancing the mixture of fertilizer ingredients and water in the form of a reaction bed moved in ascending manner through said chambers and throats and with the bed creating a vapor seal at each of said throats, and evaporating means for passing a current of drying gas through said third chamber in intimate contact with the mixture therein.

4. An apparatus for use in manufacturing granular mixed fertilizer and comprising a first elongated reaction chamber, a second elongated and closed reaction chamber and with the downstream end of said first chamber communicating with the upstream end of said second chamber by means of a throat, a third elongated and ventilated reaction chamber arranged in ascending series with said second chamber and with the downstream end of said second chamber communicating with the upstream end of said third chamber by means of a throat, supply means feeding fertilizer ingredients and water to said first chamber, mixing and advancing means arranged in each of said chambers for advancing the mixture of fertilizer ingredients and water in the form of a reaction bed moved in ascending manner through said chambers and with the bed creating a vapor seal at said throat, means disposed at least closely adjacent said throat for feeding an ammoniating agent to the reaction bed, and evaporating means for passing a current of drying gas in intimate contact with the mixture upon leaving said second reaction chamber.

References Cited in the file of this patent

UNITED STATES PATENTS

| | | |
|---|---|---|
| 709,185 | Terne | Sept. 16, 1902 |
| 1,999,026 | Tramm et al. | Apr. 23, 1935 |
| 2,203,666 | Bonotto | June 11, 1940 |
| 2,232,145 | Shoeld | Feb. 18, 1941 |
| 2,287,759 | Hardesty et al. | June 23, 1943 |
| 2,598,658 | Procter et al. | May 27, 1952 |
| 2,635,955 | Constant | Apr. 21, 1953 |
| 2,837,418 | Seymour | June 3, 1958 |